(12) United States Patent
Samuel

(10) Patent No.: US 10,678,646 B2
(45) Date of Patent: Jun. 9, 2020

(54) SELF-RECOVERING APPLICATION

(71) Applicant: Google LLC, Mountain View, CA (US)

(72) Inventor: Fady Samuel, Kitchener (CA)

(73) Assignee: Google LLC, Mountain View, CA (US)

(*) Notice: Subject to any disclaimer, the term of this patent is extended or adjusted under 35 U.S.C. 154(b) by 105 days.

(21) Appl. No.: 15/688,733

(22) Filed: Aug. 28, 2017

(65) Prior Publication Data

US 2018/0107556 A1 Apr. 19, 2018

Related U.S. Application Data

(63) Continuation of application No. 14/260,160, filed on Apr. 23, 2014, now Pat. No. 9,747,165.

(51) Int. Cl.
*G06F 11/00* (2006.01)
*G06F 11/14* (2006.01)

(52) U.S. Cl.
CPC ...... *G06F 11/1415* (2013.01); *G06F 11/1438* (2013.01)

(58) Field of Classification Search
CPC .......................... G06F 11/1415; G06F 11/1438
See application file for complete search history.

(56) References Cited

U.S. PATENT DOCUMENTS

| | | | |
|---|---|---|---|
| 6,850,257 B1 | 2/2005 | Colleran et al. | |
| 8,307,300 B1* | 11/2012 | Fisher | G06F 9/542 715/800 |
| 8,660,351 B2 | 2/2014 | Tang | |
| 8,817,054 B1 | 8/2014 | Fisher et al. | |
| 8,924,782 B2 | 12/2014 | Locasto et al. | |
| 9,070,211 B1 | 6/2015 | Kroeger et al. | |
| 9,100,588 B1* | 8/2015 | Seymour | H04N 5/2621 |
| 2002/0042835 A1* | 4/2002 | Pepin | G06F 16/258 709/232 |
| 2006/0277469 A1 | 12/2006 | Chaudhri et al. | |
| 2007/0136579 A1 | 6/2007 | Levy et al. | |
| 2008/0222375 A1 | 9/2008 | Kotsovinos et al. | |
| 2008/0243935 A1 | 10/2008 | Castro et al. | |
| 2008/0320050 A1 | 12/2008 | Chan | |

(Continued)

OTHER PUBLICATIONS

Hickson, "HTML5 Communications," Editor's Draft, Jan. 10, 2010, retrieved from https://web.archive.org/web/20100122124716/http://dev.w3.org/html5/postmsg/.

(Continued)

*Primary Examiner* — Katherine Lin
(74) *Attorney, Agent, or Firm* — Shumaker & Sieffert, P.A.

(57) ABSTRACT

Systems and methods for recovering a process in an application are disclosed. According to some aspects, a guest process is run within an application executing at a computing device. The guest process stores and processes untrusted content. An embedder process is run within the application and in parallel with the guest process. The embedder process stores and processes trusted content and a guest process state. The guest process state is periodically updated based on asynchronous communication between the guest process and the embedder process. The embedder process receives an indication of an execution failure of the guest process. The guest process is recovered after the execution failure based on the guest process state stored by the embedder process.

18 Claims, 8 Drawing Sheets

(56) References Cited

U.S. PATENT DOCUMENTS

| | | |
|---|---|---|
| 2009/0164581 A1 | 6/2009 | Bove et al. |
| 2009/0183155 A1* | 7/2009 | Praitis ............... G06F 9/468 |
| | | 718/100 |
| 2009/0287824 A1* | 11/2009 | Fisher ............... G06F 9/542 |
| | | 709/226 |
| 2010/0057932 A1 | 3/2010 | Pope et al. |
| 2010/0175021 A1 | 7/2010 | Ferrara et al. |
| 2011/0012929 A1 | 1/2011 | Grosz et al. |
| 2011/0057932 A1 | 3/2011 | Missbach et al. |
| 2012/0190386 A1 | 7/2012 | Anderson |
| 2012/0216072 A1 | 8/2012 | Zeigler et al. |
| 2012/0254381 A1* | 10/2012 | Rodrigues ........... G06F 3/1454 |
| | | 709/221 |
| 2013/0101210 A1 | 4/2013 | Tang |
| 2014/0095329 A1 | 4/2014 | Liu et al. |
| 2015/0089512 A1* | 3/2015 | Li ..................... H04L 63/10 |
| | | 719/313 |

OTHER PUBLICATIONS

"<webview> tag," 20 pages, archived Feb. 28, 2014, retrieved from https://web.archive.org/web/20140228202537/http://developer.chrome.com/tags/webview.

"webview Tag," 31 pages, 2013, retrieved from https://developer.chrome/apps/tag s/webview.html.

* cited by examiner

SELF-RECOVERING APPLICATION

CROSS REFERENCE TO RELATED APPLICATION

The present application is a continuation application of U.S. patent application Ser. No. 14/260,160 entitled "SELF-RECOVERING APPLICATION," filed on Apr. 23, 2014, which is hereby incorporated by reference in its entirety for all purposes.

BACKGROUND

The subject technology is generally directed to a self-recovering application executing on a computing device.

An application may load untrusted content from an external source, for example, a web server. The application may be a web application executing on a web browser of a computing device or an independent application of the computing device. The untrusted content may include web-based source code or visual or audio content. The untrusted content may not be secure and, thus, may cause the application to become non-responsive or to crash.

SUMMARY

According to some aspects, the subject technology relates to a method for recovering a process in an application. The method includes running, within an application executing at a computing device, a guest process, the guest process storing and processing untrusted content. The method includes running, within the application and in parallel with the guest process, an embedder process, the embedder process storing and processing trusted content and a guest process state. The method includes signaling for periodically updating the guest process state based on asynchronous communication between the guest process and the embedder process. The method includes signaling for receiving, at the embedder process, an indication of an execution failure of the guest process. The method includes signaling for recovering the guest process after the execution failure based on the guest process state stored by the embedder process.

According to some aspects, the subject technology relates to a non-transitory computer-readable medium storing instructions. The instructions include code for running, within an application executing at the computer, a guest process, the guest process storing and processing untrusted content for presentation to the user of the computer. The instructions include code for running, within the application and in parallel with the guest process, an embedder process, the embedder process storing and processing trusted content and a guest process state, the embedder process being stored locally at the computer and lacking bugs. The instructions include code for signaling for periodically updating the guest process state based on asynchronous communication between the guest process and the embedder process. The instructions include code for signaling for receiving, at the embedder process, an indication of an execution failure of the guest process. The instructions include code for signaling for recovering the guest process after the execution failure based on the guest process state stored by the embedder process.

According to some aspects, the subject technology relates to a system. The system includes one or more processors and a memory storing instructions. The instructions include code for running, within an application executing at a computing device, a guest process, the guest process storing and processing untrusted content. The instructions include code for running, within the application and in parallel with the guest process, an embedder process, the embedder process storing and processing trusted content and a guest process state. The instructions include code for signaling for periodically updating the stored guest process state at the embedder process. The instructions include code for signaling for receiving, at the embedder process, an indication of an execution failure of the guest process. The instructions include code for signaling for recovering the guest process after the execution failure based on the guest process state stored by the embedder process.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
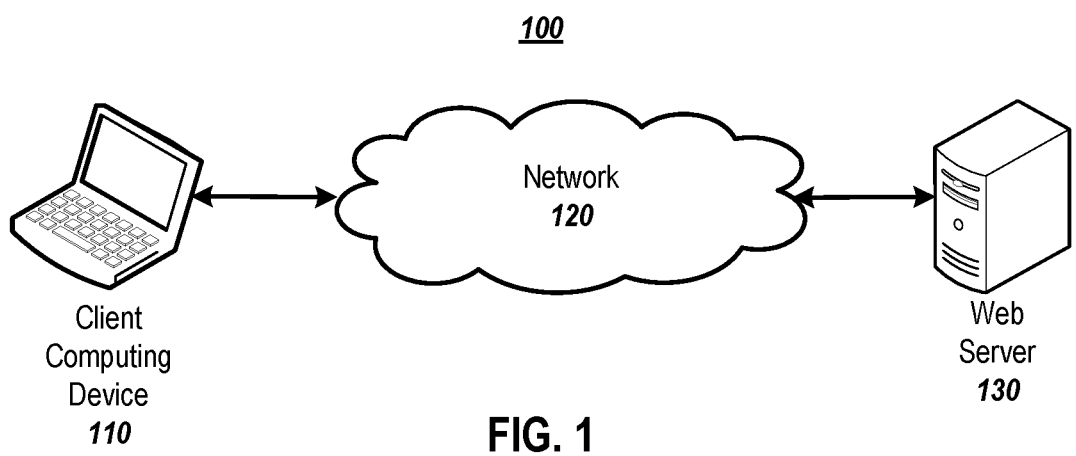
FIG. 1 illustrates an example network system for executing a primary application at a client computing device.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

As set forth above, an application may load untrusted content from an external source, for example, a web server. The application may be a web application executing on a web browser of a computing device or an independent application of the computing device. The untrusted content may include web-based source code or visual or audio content. The untrusted content may not be secure, may not be trusted to be stable or may not be verified to lack bugs and, thus, may cause the application to become non-responsive or to crash (e.g., due to bugs or security failures). In such circumstances, the user may need to restart the application, possibly losing some of the data in the application. As the foregoing illustrates, a new approach for handling the untrusted content to prevent the application from becoming non-responsive or from crashing may be desirable. Also, a new approach for automatically responding to circumstances where the untrusted content may cause the application to become non-responsive or to crash, may be desirable.

As used herein, the phrase "trusted content" may include to, among other things, content associated with a browser that has been tested or verified by the developer of the browser. "Untrusted content" may include, among other things, content from an Internet source (e.g., a website) that has not necessarily been tested or verified by the developer of the browser.

The subject technology provides techniques for handling untrusted content in an application. In some examples, the subject technology may be used to prevent the application from becoming non-responsive or from crashing. In some examples, the subject technology may be used to respond automatically to circumstances where the untrusted content causes a process executing within the application to become non-responsive or to crash.

In some implementations, a primary application includes a guest process and an embedder process. For example, the primary application may be a web browser. The embedder process may be a process associated with an embedder application. The embedder application may be a browser application, for example, a browser application for playing a video game in the web browser, watching a video in the web browser, reading a newspaper in the web browser, etc. The guest process may be associated with online or user-generated content within the application, for example, a process for generating certain graphics in the video game application that is downloaded from a web server. According to some implementations, the primary process controls operation of a web browser. The embedder process controls operation of a browser application that is embedded in the web browser, for example, a browser application for accessing email, playing a card game, watching online videos, etc. Browser application(s) may be stored within the web browser and may execute within the web browser. The web browser may include a display listing all or a portion of the browser application(s) stored within the web browser and may provide access to an application store for downloading additional application(s), in some case(s), for a fee. The guest process controls operation of guest content (e.g., hypertext markup language (HTML) content within the browser application embedded in the web browser). The guest process may be implemented using the WebView class in JavaScript. The WebView class provides a view that may display web pages. The WebView class is the basis upon which web-based content may be presented within the browser application embedded in the web browser. The WebView class may display web pages and includes technique(s) to navigate forward and backward through a history, zoom in and out, perform text searches, etc. The WebView class may be used to load live content (e.g., guest content) from the web over a network and embed the live content into the browser application. The browser application may control the appearance of the WebView, initiate navigations in the guest content (e.g., a web page), react to error events that happen in the guest content, etc.

The WebView class may be used to embed guest content into a browser application. The guest content is contained within the webview container, an embedder page within the browser application that controls how the guest content is laid out and rendered. Different from the iframe in JavaScript, the webview runs in a separate process than the browser application. The webview does not necessarily (e.g., may or may not) have the same permissions as the browser application and embedded content may be asynchronous with the browser application. Thus, the browser application may be safe from the guest content in the webview. To implement a webview using the WebView class, an programmer of a browser application may provide the source of the webpage (e.g., a uniform resource locator (URL) address) and Cascading Style Sheets (CSS) styles that control the appearance of the webview container.

The guest process processes untrusted content, which is displayed in a webview visual output. The embedder process processes trusted content, which is displayed in an embedder application view, within a primary application view of the primary application. The embedder process may also store a guest process state, indicating a state (e.g., values and data stored or displayed) of the guest process. The guest process and the embedder process may communicate using asynchronous communication.

In some implementations, the guest process state, stored by the embedder process, may be updated based on the asynchronous communication. In an event of an execution failure of the guest process, which processes the untrusted content, the embedder process may cause recovery of the guest process based on the stored guest process state. Advantageously, as a result of some implementations of the subject technology, execution failure(s) caused by the untrusted content may be handled by the primary application, using the stored guest process state in the embedder process. The execution failure(s) caused by the untrusted content may be handled by the primary application and may, in some cases, not cause crashing or non-responsiveness of the primary application or the embedder application.

In some implementations, the guest process may request to present, via a display unit, an image associated with the untrusted content. The image may correspond to a webview visual output. The embedder process may specify size constraints for the image. The guest process may adjust the image to fit within the size constraints specified via the embedder process. As a result, a developer of the embedder application is able to prevent the untrusted content from occupying all of the visual output of the embedder application, thereby preventing a user from providing, to a server associated with the untrusted content, private information entrusted to the embedder application but not entrusted to a server associated with the untrusted content.

In some implementations, the primary application may receive a user input (e.g., a mouse click or a touch of a touchscreen) within a webview visual output associated with the guest process. The webview may be within the embedder application view and the user input may correspond to an event to be handled. The event may be queued for processing by the guest process. If the queued event is handled by the guest process within a threshold time period (e.g., 0.5 seconds or 1 second), the queued event may be dequeued. Alternatively, if the guest process crashes or is unresponsive during the threshold time period, the primary application may signal for handling the queued event by the embedder process.

Using the techniques above, the primary application may build a queue including multiple events for processing by the guest process. If the guest process crashes or becomes unresponsive at a first time, the primary application may signal for handling of first unprocessed events in the queue by the embedder process. The first unqueued events are unprocessed at the first time. If the guest process becomes operational again, at a second time later than the first time, the primary application may signal for handling of second unprocessed events in the queue by the guest process. The second unprocessed events are unprocessed at the second time. Advantageously, event(s) associated with the guest process or the untrusted content may be processed even if the guest process or the untrusted content is not operational.

FIG. 1 illustrates an example network system 100 for executing a primary application at a client computing device. As shown, the network system 100 includes a client computing device 110 and a web server 130 connected to a network 120. The client computing device 110 and the web server 130 may communicate with one another via the network 120. The network 120 may include any network(s), for example, the Internet, an intranet, a cellular network, a local area network, a wide area network, a wired network, a wireless network, a virtual private network (VPN), etc. The client computing device 110 may be any computing device, for example, a laptop computer, a desktop computer, a tablet computer, a mobile phone, a personal digital assistant (PDA), an electronic music player, a smart watch, a television coupled with one or more processors and a memory, etc. The client computing device 110 may store and execute a primary application or an embedder application that may implement all or a portion of the techniques described herein. The web server 130 may be a server that stores web-based content accessible at the client computing device 110 via the network 120. While a single client computing device 110 and a single web server 130, connected via a single network 120, are illustrated in FIG. 1, the subject technology may be implemented with multiple client computing devices 110 and multiple web servers 130 connected via one or more networks.

Figure 2:
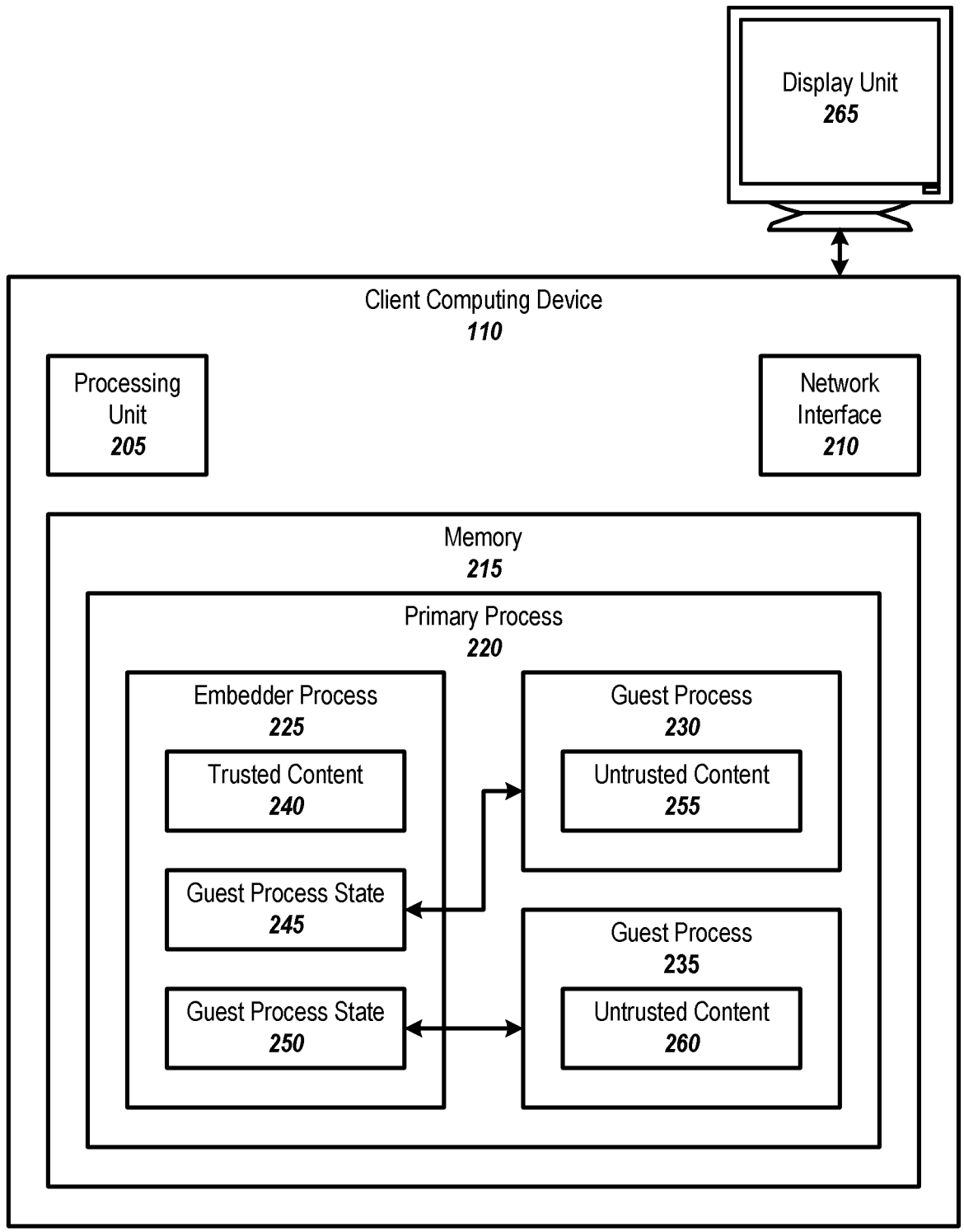
FIG. 2 illustrates an example of the client computing device of FIG. 1.

FIG. 2 illustrates an example of the client computing device 110. As shown, the computing device 110 includes a processing unit 205, a network interface 210, and a memory 215, and is coupled with a display unit 265. The processing unit 205 includes one or more processors. The processing unit 205 may include a central processing unit (CPU), a graphics processing unit (GPU), or any other processing unit. The processing unit 205 executes computer instructions that are stored in a computer-readable medium, for example, the memory 215. The network interface 210 allows the client computing device 110 to transmit and receive data in a network, for example, the network 120 of FIG. 1. The memory 215 stores data and/or instructions. The memory 215 may be one or more of a cache unit, a storage unit, an internal memory unit, or an external memory unit. As illustrated, the memory 215 includes a primary process 220. The display unit 265 is configured to display information and may include one or more screens, monitors, or projectors. The information displayed via the display unit 265 may be controlled by the processing unit 205 executing instructions stored in the memory 215.

As shown, the memory stores a primary process 220. The primary process controls operation of a primary application, for example, a web browser. The operation of the primary application may include displaying web page(s) or web-based content, executing embedder application(s), presenting webviews that include untrusted guest content, etc. The primary process 220 may be associated with an application that provides visual output via the display unit 265, for example, a web browser application or another application. In some examples, the primary process 220 may be associated with an operating system storing and executing multiple applications. As illustrated, the primary process 220 includes an embedder process 225 and two guest processes 230 and 235, which execute within the primary process 220. However, the subject technology may be implemented with one or multiple embedder processes and one, two, or more than two guest processes.

The embedder process 225 executes within the primary process 220. For example, if the primary process 220 corresponds to a web browser, the embedder process 225 may be a browser application, for example, for playing a video game within the web browser. The embedder process 225 stores trusted content 240 which is trusted to be stable, for example, which is known (e.g., to a developer of the primary process 220) to lack bugs or malicious software.

The guest processes 230 and 235 also execute within the primary process 220 and store untrusted content 255 and 260, respectively. In some cases, the guest processes 230 or 235 may execute within the embedder process 225. For example, if the primary process 220 corresponds to a web browser and the embedder process 225 corresponds to a browser application, the guest process 230 may correspond to a process for handling untrusted web-based content presented within the browser application and the guest process 235 may correspond to a process for handling user-generated content within the browser application.

The guest processes 230 and 235 store and process untrusted content 255 and 260, respectively. The untrusted content 255 or 260 may include untrusted web-based or user-generated content that is not trusted for example, for example that has not been verified (e.g., by a developer of the primary process 220) to lack bugs or malicious software. As a result, the guest processes 230 and 235 may be more prone to crashing or becoming unresponsive than the embedder process 225.

As shown, the embedder process 225 stores a guest process state 245 and 250 for each guest process 230 and 235, respectively. The guest process state 245 or 250 stores a state of the corresponding guest process 230 or 235 (e.g., a visual output state, a values of input provided by the user, values of variables controlled by the guest process 230 or 235, etc.). The embedder process 225 determines the guest process state 245 or 250 via asynchronous communication with the corresponding guest process 230 or 235. When the corresponding guest process 230 or 235 crashes or becomes unresponsive, the stored guest process state 245 or 250, respectively, may be used to recover the corresponding guest process 230 or 235. As a result, the corresponding guest process 230 or 235 may be recovered automatically and without user input.

In some cases, the primary process 220 or the embedder process 225 may load the untrusted content 255 or 260 from an external source, for example, a web server. The untrusted content 255 or 260 may include web-based source code or visual or audio content.

The untrusted content 255 or 260 may not be secure and may, in some cases, cause the application (e.g., web browser, browser application, or other application) associated with the primary process 220 or the embedder process 225 to crash or fail to execute properly. In such circumstances, a user may have to restart the application and re-create or re-access some of the content created or accessed by the user in the application. The subject technology, according to some implementations, provides a new approach for preventing application crashes or execution failures or recovering data in the event of a crash or a failure may be desirable.

The subject technology, according to some examples, provides techniques for preventing application crashes or execution failures or recovering data in the event of a crash or a failure. According to some implementations, an application executing on a computing device runs two processes in parallel—an embedder process 225 and a guest process 230. The guest process 230 controls untrusted user interface elements (e.g., web-based user interface elements, which may include layout elements, animation elements, or 3D WebGL elements). The embedder process 225 controls trusted elements of the application, for example, navigation, links, or loading of third party content. The embedder process 225 also stores a representation of the state of the guest process 230, as guest process state 245, so that the state of the guest process 230 can be re-accessed in an event of a crash or execution failure of the guest process.

Figure 3:
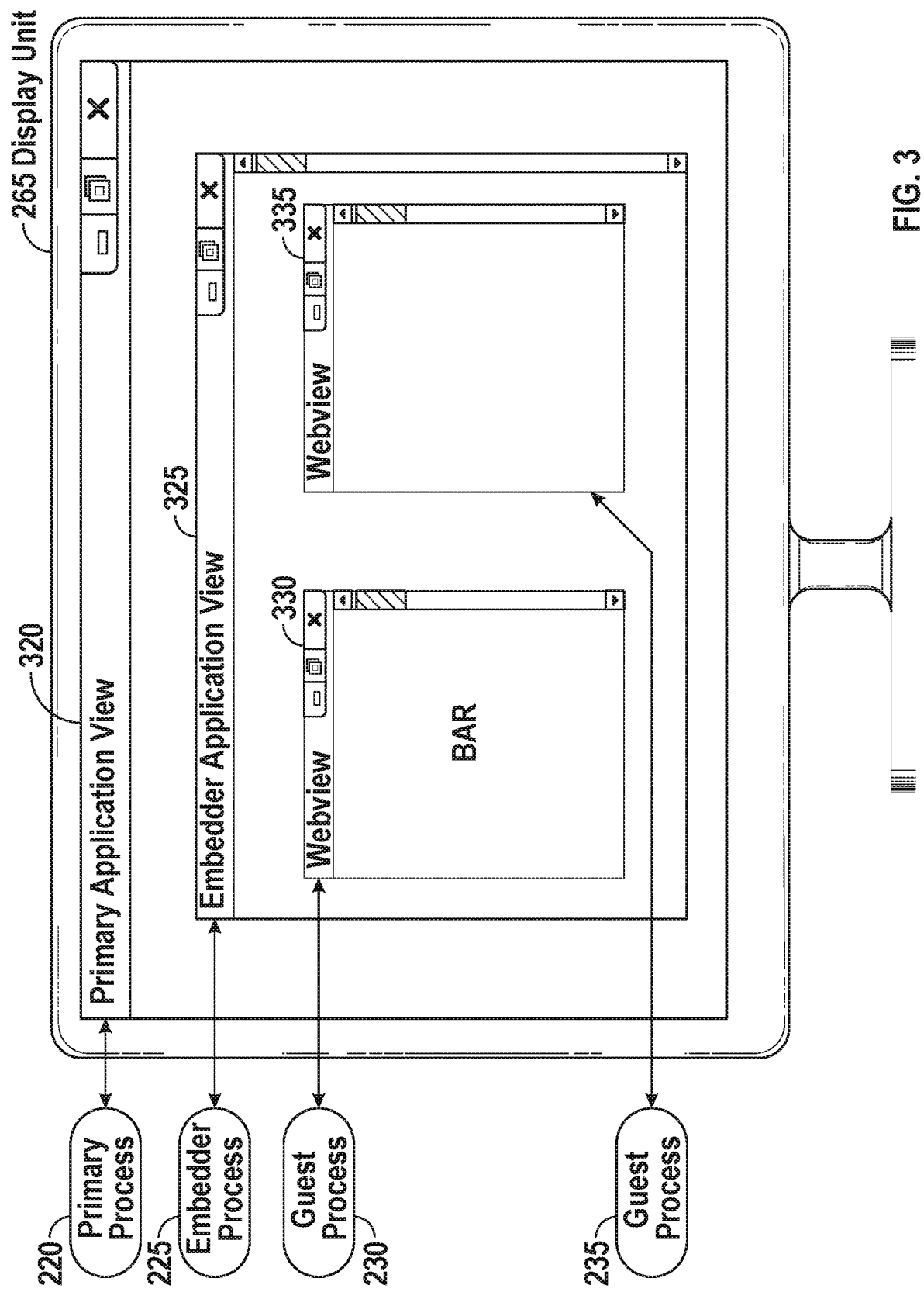
FIG. 3 illustrates an example of information that may be displayed via a display unit of the client computing device of FIGS. 1-2.

FIG. 3 illustrates an example of information that may be displayed via the display unit 265 of the client computing device 110. As shown, the display unit 265 displays a primary application view 320, which may be associated with the primary process 220. For example, if the primary process 220 controls operation of a web browser, the primary application view 320 may be a display of a page in the web browser.

The primary application view 320 includes an embedder application view 325 within the primary application view 320. The embedder application view 325 is associated with the embedder process 225. For example, if the embedder process 225 controls operation of a browser application, the embedder application view 325 may correspond to the visual output of the browser application.

The webviews 330 and 335 correspond to the guest processes 230 and 235, respectively. For example, the guest process 230 may handle web-based untrusted content, which may be displayed in the webview 330. The webviews 330 and 335 may be created using the WebView class in JavaScript and may be portions of the primary application view 320 dedicated to presenting the untrusted content 255 and 260 of the guest processes 230 and 235, respectively. For example, a webview may be associated with an untrusted webpage of a newspaper that is not trusted to be stable, for example, that is not verified to lack bugs, and may present content from the webpage of the newspaper, where the webpage of the newspaper is being accessed by an embedder application associated with the embedder application view 325. The guest process 235 may handle user-generated untrusted content, which may be displayed in the webview 335.

In some circumstances, the guest process 230 provides visual output within the webview 330 and handles user-input within the webview 330. The guest process 235 provides visual output and handles user-input within the webview 335. The embedder process 225 provides visual output and handles user-input within the embedder application view 325 and outside the webviews 330 and 335. The primary process 220 provides visual output and handles user-input within the primary application view 320 and outside the embedder application view 325.

In some circumstances, the primary process 220 controls a primary application that generates the primary application view 320. The embedder process 225 controls operation of the embedder application, controlling operation of the embedder application may include generating the embedder application view 325. The guest process 230 is a process within the primary application or the embedder application that generates the webview 330. The guest process 235 is a process within the primary application or the embedder application that generates the webview 335.

Figure 4:
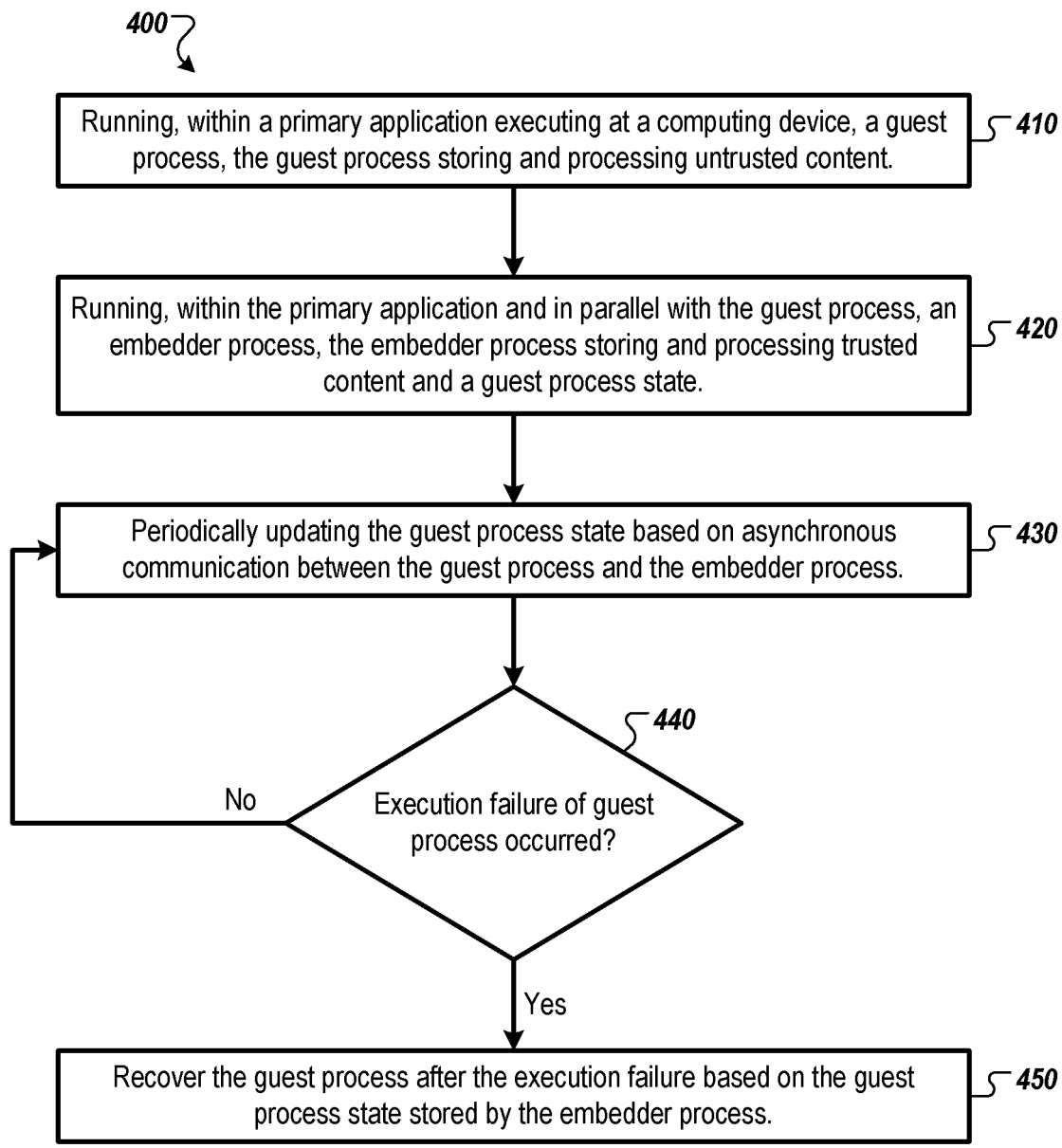
FIG. 4 illustrates an example procedure by which a process in an application executing on a computing device may be recovered.

FIG. 4 illustrates an example procedure 400 by which a process in an application executing on a computing device may be recovered.

In step 410, a computing device (e.g., computing device 110) runs, within a primary application executing at the computing device, a guest process (e.g., guest process 230). The guest process stores and processes untrusted content (e.g., untrusted content 255). The untrusted content may correspond to a webview content, which may include untrusted online content or user-generated content. The primary application may be associated with a primary process (e.g., primary process 220).

In step 420, the computing device runs, within the primary application and in parallel with the guest process, an embedder process (e.g., embedder process 225). The embedder process stores and processes trusted content (e.g., trusted content 240) and a guest process state (e.g., guest process state 245). The trusted content of the embedder process, and the embedder process itself, may be stored in a local memory of the computing device and may be trusted to be stable, for example, known to lack bugs. The embedder process and the guest process may communicate with one another using asynchronous communication, for example, XQ Script or Postmessage API. The asynchronous communication may be controlled or triggered by user input events, for example, a mouse click, a mouse hover, a touch of a touch screen, a touch of a key on a keyboard, etc. Under asynchronous communication, data may be transmitted without the use of an external clock signal, and data may be transmitted intermittently rather than in a steady stream. As a result of the asynchronous communication technique, sending message(s) from the guest process to the embedder process or from the embedder process to the guest process does not block, prevent, interfere with, or slow down the operation of either the guest process or the embedder process.

In step 430, the computing device periodically updates the guest process state. The guest process state may be updated, by the embedder process, based on the asynchronous communication between the guest process and the embedder process. The primary process may signal for the embedder process to update the guest process state based on the asynchronous communication. The guest process state may be periodically updated in response to a predetermined event. The predetermined event may include one or more of: a mouse click, a mouse movement, a keyboard tap, or a touch of a touchscreen.

In step 440, the computing device determines whether an execution failure of the guest process occurred. The execution failure may correspond to a crash of the guest process or to non-responsiveness of the guest process for at least a threshold time period (e.g., 0.5 seconds, 1 second, 2 seconds, etc.). The threshold time period may be determined based on factor(s) including, for example, a processing speed of the computing device or a network connection speed of the computing device. The primary process may determine whether the execution failure of the guest process occurred. Alternatively, the primary process may signal for the embedder process to determine whether the execution failure of the guest process occurred based on a failure of the asynchronous communication or a lack of asynchronous communication. If an execution failure of the guest process has occurred, the procedure 400 continues to step 450. If an execution failure of the guest process has not occurred, the procedure 400 returns to step 430.

In step 450, if an execution failure of the guest process has occurred, the computing device recovers the guest process after the execution failure based on the guest process state stored by the embedder process. The primary process may signal for the embedder process to recover the guest process using the stored guest process state. For example, the embedder process may re-load the guest process using the stored guest process state. Alternatively, the embedder process may kill the guest process and, after killing the guest process, re-create the guest process using the stored guest process state. In another alternative, the embedder process may push the stored guest process state into the guest process. After step 450, the procedure 400 ends.

In some cases, an application, for example, a web application executing on a web browser of a computing device (e.g., client computing device 110) or an independent application of the computing device, may load untrusted content (e.g., untrusted content 255 or 260, which may be web-based source code or visual or audio content) from an external source, for example, a web server. The untrusted content may not be secure.

As a result of the untrusted content possibly not being secure, a developer of the application may wish to prevent the untrusted content from occupying all of the visual output of the application, thereby preventing a user from providing, to a web server (e.g., web server 130) associated with the untrusted content, private information entrusted to the application but not to the web server associated with the untrusted content. If the untrusted content were to occupy all of the visual output of the application, the untrusted content may copy the display of the application to trick the user into thinking that he/she is interacting or providing data to the application when he/she is really interacting or providing data to the web server associated with the untrusted content. As the foregoing illustrates, an approach for presenting untrusted content that would prevent the user from unknowingly sharing private information with the web server associated with the untrusted content may be desirable.

The subject technology, in some implementations, provides techniques for presenting untrusted content in an application, for example, a web application executing in a browser or an independent application executing in an operating system. Some implementations are designed to prevent the user from unknowingly sharing private information with the web server associated with the untrusted content. For example, some implementations of the subject technology may protect users from phishing operations.

Figure 5:
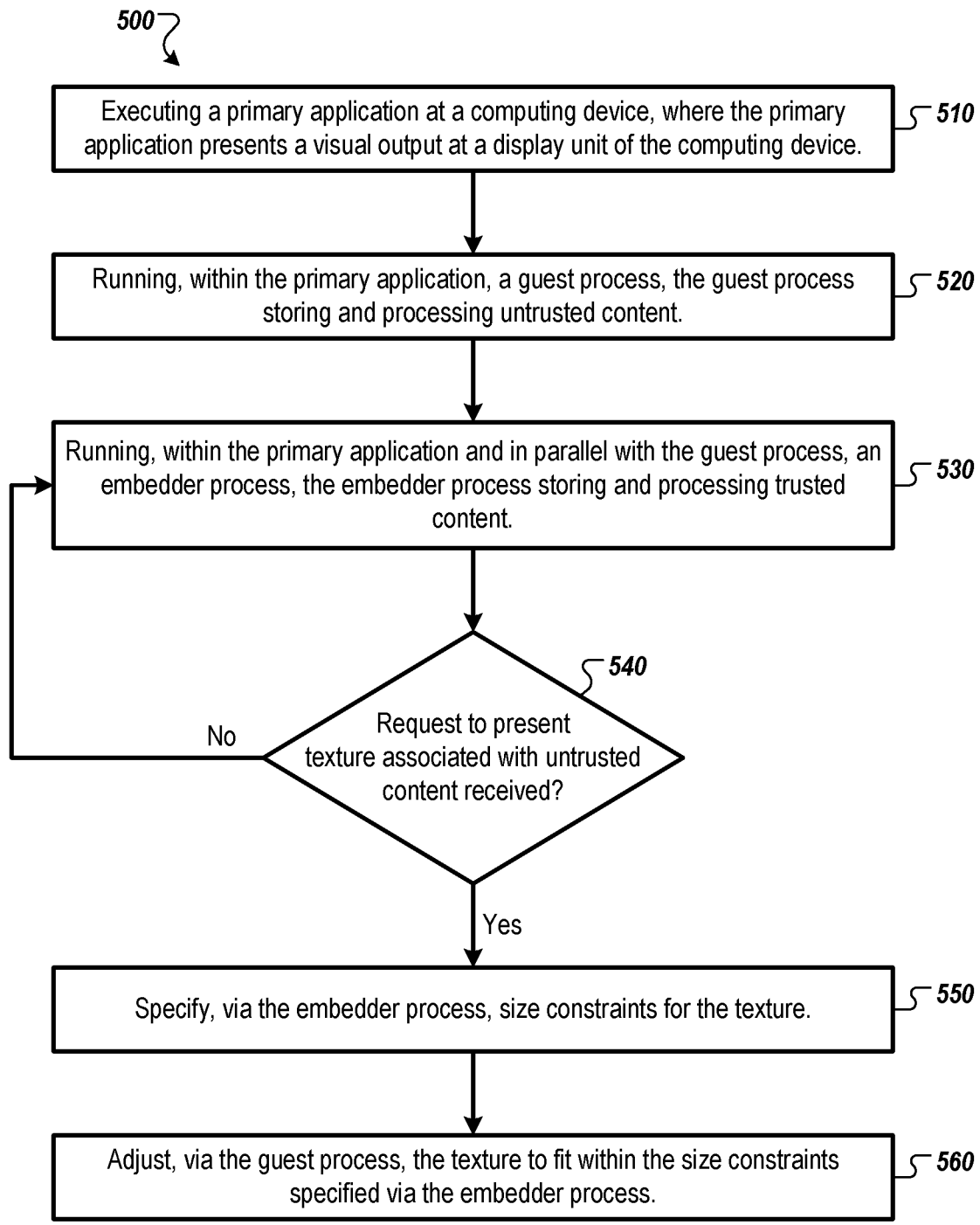
FIG. 5 illustrates an example procedure by which an image may be presented in an application executing on a computing device.

FIG. 5 illustrates an example procedure 500 by which an image may be presented in an application executing on a computing device.

In step 510, a computing device (e.g., client computing device 110) executes a primary application, which may be a web browser or any other application. The primary application is associated with a primary process (e.g., primary process 220) and presents a visual output (e.g., primary application view 320) at a display unit (e.g., display unit 265) of the computing device.

In step 520, the computing device runs, within the primary application, a guest process (e.g., guest process 230). The guest process stores and processes untrusted content (e.g., untrusted content 255), which may be untrusted online content or user-generated content.

In step 530, the computing device runs, within the primary application and in parallel with the guest process, an embedder process (e.g., embedder process 225). The embedder process stores and processes trusted content (e.g., trusted content 240). The embedder process and the trusted content may be stored in a local memory of the computing device and may be trusted to be stable, for example, known (e.g., to a developer of the primary application) to lack bugs.

In step 540, the computing device determines whether a request to present, within the visual output of the primary application, an image associated with the untrusted content has been received. The request to present the image associated with the untrusted content may come from the guest process and may be received by the embedder process or the primary process. If the request has been received, the procedure 500 continues to step 550. If the request has not been receive, the procedure 500 returns to step 530.

In step 550, if the request to present the image associated with the untrusted content has been received, the embedder process specifies size constraints for the image. For example, the embedder process may provide a 200×200 pixel box for the image and specify that the image may be placed inside the box. The primary process may signal for the embedder process to specify the size constraints.

In step 560, the primary process signals for the guest process to adjust the image to fit within the size constraints specified by the embedder process. The guest process adjusts the image accordingly. The image associated with the untrusted content of the guest process may be presented, at the display unit, within a second image associated with the trusted content of the embedder process. The image associated with the untrusted content of the guest process may occupy a portion of the visual output presented by the application that is not the entire visual output presented by the application. Other visual output presented by the application may be associated with the primary process or the embedder process.

In some cases, the embedder process specifies size constraints for the image (e.g., a minimum width, a maximum width, a minimum height, and a maximum height). If the guest process is cooperative, the guest process adjusts the image to fit within the size constraints. The guest process may adjust the image to fit within the size constraints based on information about the image known to the guest process (e.g., the width is twice the height). However, in some cases, the guest process may not be cooperative (e.g., due to bugs in the guest process or due to the guest process being associated with a phishing operation). For example, the guest process may specify adjusted size constraints for the image that are larger than the maximum size constraints or smaller than the minimum size constraints. If the guest process specifies adjusted size constraints for the image that are larger than the maximum size constraints, the embedder process crops out the part of the image that is in the space exceeding the maximum size constraints (e.g., showing only the uppermost or leftmost part of the image). If the guest process specifies adjusted size constraints for the image that are smaller than the minimum size constraints, the embedder process presents white space to fill the gap between the space taken up by the image and the space assigned according to the minimum size constraints.

As a result of the embedder process creating the size constraints for the untrusted content, the untrusted content may be prevented from taking over the entire visual output of the primary application or the entire visual output associated with the embedder process. Information (e.g., an email address, a telephone number, etc.) that the user entrusted to the primary application or to the embedder process, but not to the guest process or the untrusted content, may be less likely to be inadvertently provided by the user to the guest process or the entrusted content. The user's privacy may be protected.

The embedder process may specify readjusted size constraints for the image, and the guest process may readjust the image to fit within the readjusted size constraints specified by the embedder process. In steps 540, 550, and 560, the guest process and the embedder process may communicate (e.g., send messages) between one another using asynchronous communication. The asynchronous communication may not interfere with the operation of either the guest process or the embedder process. After step 560, the procedure 500 ends.

A primary application may run multiple processes associated with multiple visual outputs. The primary application may receive a user input, for example, a pressing of a hotkey for copying or pasting content or a movement of a mouse scroll wheel for scrolling within displayed information. In such cases, determining which process the user intended to handle the user input (or which of the multiple visual outputs the user intend to modify or access) may be challenging and an incorrect determination of the user's intent may breach the user's security by causing the user to share secure information with a service that may not be secure or the user may not trust. As the foregoing illustrates a new approach for processing of user inputs in a multi-process application may be desirable.

For example, a user may have his/her bank information in the clipboard of the computing device for pasting. The user may then copy other information (e.g., text that is not private) from a first guest process and attempt to paste the other information into a second guest process. If the user's intent is carried out, the second guest process may receive the public information. However, if the computing device processes the paste command before the copy command, the second process may receive the user's bank information and the user's security may be compromised (e.g., if the user did not intend to share his/her bank information with the second guest process or if the second guest process is not trusted to be stable).

Without the subject technology, a malicious guest process may resize its image to occupy the entire display area of the embedder process and may make itself look like the embedder process. As a result, a user may think that he/she is interacting with the trusted embedder process when he/she is really interacting with the untrusted guest process, and the user may inadvertently provide private information to the guest process that he/she intended to provide to the embedder process but not to the guest process.

An embedder application (e.g., associated with the embedder process 225) executing within the primary application may include one or more embedded guest processes (e.g., guest processes 230 and 235), each of which is associated with a webview (e.g., webviews 330 and 335). In one example, the embedder application is a browser application and the webview(s) include content, from webpage(s), that is loaded into the browser application. Alternatively, the embedder application may execute directly on the computing device, not within a browser, and the webview(s) include content, from web server(s), that is loaded into the embedder application.

According to some aspects, the client computing device 110 receives a user input within the webview 330 associated with the guest process 230. The user input corresponds to an event to be handled. The event is queued for handling by the guest process 230. The event is dequeued in a case where the event is handled by the guest process 230 within a threshold time period (e.g., 0.1 seconds or 0.5 seconds). The event is handled by the embedder process 225 in a case where the guest process 230 crashes or in a case where the guest process 230 is unresponsive during the threshold time period.

Queuing the event for handling by the guest process may include adding the event to a queue including multiple events for handling by the guest process 230. Upon determining, at a first time, that the guest process 230 crashes or is unresponsive during the threshold time period, the primary process 220 may cause unprocessed (at the first time) events in the queue to be handled by the embedder process 225. Upon determining, at a second time later than the first time, that the guest process 230 has become responsive again, the primary process 220 may cause unprocessed (at the second time) events in the queue to be handled by the guest process 230. In other words, the unprocessed (at the second time) events may be requeued for handling by the gest process 230.

In a first example implementation, the word "FOO" may be in the clipboard. The user may select the word "BAR" in the webview 330 and press the shortcut for the copy command (Ctrl+C) on the keyboard. The user may then select the webview 335 and enter the paste command (Ctrl+V) via the keyboard. In this example, the user's intent is to paste the word "BAR" into the webview 335. However, if switching the webview 330 or 335 having focus occurs faster than processing the copy command, the word "FOO" may end up being pasted into the webview 335. The process described above prevents this by queuing events for processing to ensure that events are processed in the same order that inputs for events are entered by the user.

In a second example implementation, the webview 330 may have focus and the user may be using a scroll wheel on a mouse to scroll through the webview 330. Upon processing each scrolling command, the guest process 230 associated with the webview 330 acknowledges, to the embedder process 225 and to the primary process 220, that the scrolling command has been processed. However, in some cases, the guest process 230 may crash or become unresponsive (e.g., hang) while scrolling command(s) are still queued or being inputted by the user.

If the guest process 230 crashes, the primary process 220 is informed of the crash. The primary process 220 then causes the embedder process 225 to handle the queued and unprocessed event(s) of the guest process 230 and subsequent user input(s) provided within an interface associated with the guest process 230 (e.g., within the webview 330).

Similarly, if the guest process 230 is not responsive for at least the threshold time period, the primary process 220 causes the embedder process 225 to handle the queued and unprocessed event(s) of the guest process 230 and subsequent user input(s) provided to the guest process 230. Later, if the guest process 230 becomes responsive again, the primary process 220 may cause the guest process 230 to handle the event(s) that are queued and unprocessed at the time when the guest process 230 becomes responsive again.

The guest process 230 may also accept new user input(s) for processing when the guest process 230 becomes responsive again.

Figure 6:
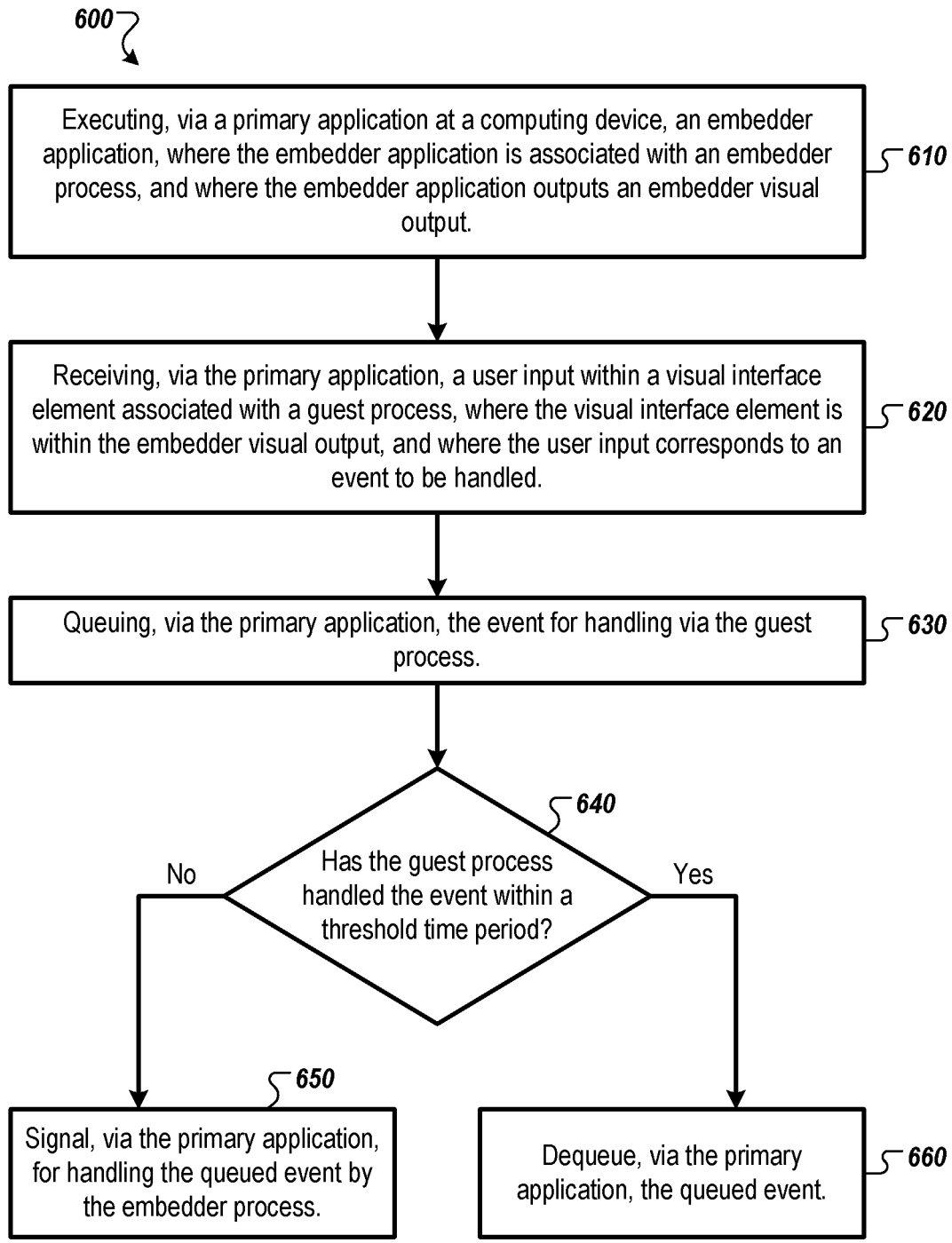
FIG. 6 illustrates an example procedure by which an event may be handled in an application executing on a computing device.

FIG. 6 illustrates an example procedure 600 by which an event may be handled in an application executing on a computing device.

In step 610, where a computing device (e.g., client computing device 110) executes, via a primary application, an embedder application. The primary application is associated with a primary process (e.g., primary process 220) and outputs a primary visual output (e.g., primary application view 320). The embedder application is associated with an embedder process (e.g., embedder process 225) and outputs an embedder visual output (e.g., embedder application view 325).

In step 620, the primary application receives a user input within a visual interface element (e.g., webview 330) associated with a guest process (e.g., guest process 230). The visual interface element associated with the guest process is within the embedder visual output and may include untrusted content. The user input corresponds to an event to be handled. The user input may include any user input, for instance, a mouse hover, a mouse click, a text entry, or a touch of a touchscreen. For example, the user input may be a selection of the text "BAR" in the webview 330 of FIG. 3, and a pressing of a hotkey (e.g., CTRL+C) for copying the selected text on a keyboard.

The guest process may execute within the primary application and in parallel with the embedder process, and the guest process and the embedder process may transmit messages to one another using asynchronous communication. In some cases, the asynchronous communication between the guest process and the embedder process does not interfere with the operation of the guest process and does not interfere with the operation of the embedder process.

In step 630, the primary application queues the event for handling via the guest process. For example, the selection of the text and the pressing of the hotkey may be queued for handling via the guest process. Handling the event may include modifying a visual output or stored information associated with the primary application in response to the user input.

In step 640, the primary application determines whether the guest process has handled the event within a threshold time period (e.g., 0.5 seconds, 1 second, 2 seconds, etc.). The threshold time period may be determined based on factors including a processing speed of the computing device, a network connection speed of the computing device, or a user-interface responsiveness speed of the computing device. If the guest process has not handled the event within the threshold time period, the primary application concludes that the guest process has crashed or is not responsive and the procedure 600 continues to step 650. If the guest process has handled the event within the threshold time period, the guest process is responsive and the procedure 600 continues to step 660.

In step 650, if the guest process has not handled the event within the threshold time period, the primary application concludes that the guest process has crashed or is not responsive. Accordingly, the primary application signals for handling the queued event via the embedder process so that the event is handled even if the guest process is not operational. After step 650, the procedure 600 ends.

In step 660, if the guest process has handled the event within the threshold time period, the primary application dequeues the event, as the event has already been handled and no longer needs to be processed. After step 660, the procedure 600 ends.

Figure 7:
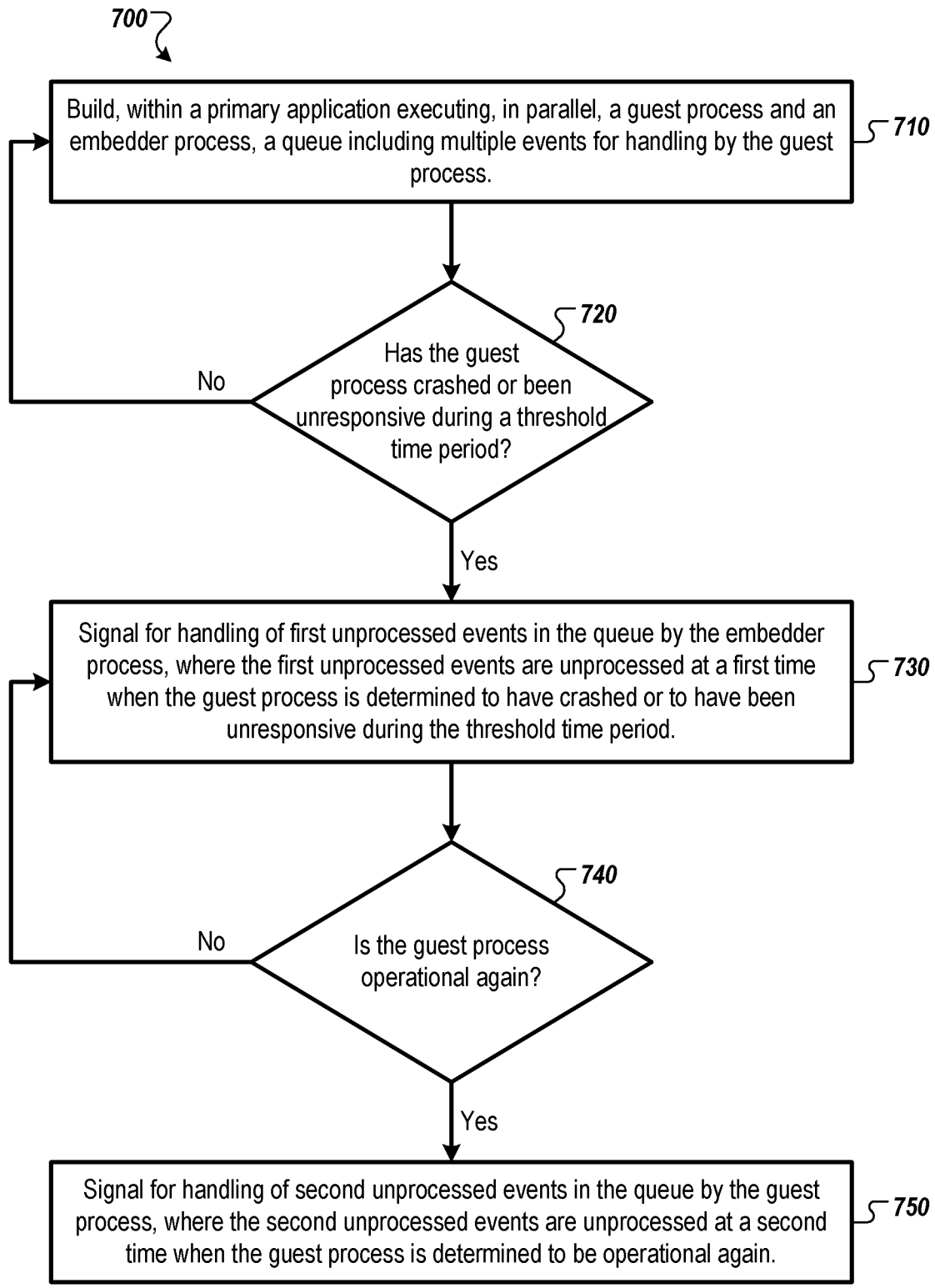
FIG. 7 illustrates an example procedure by which events may be queued for handling in an application executing on a computing device.

FIG. 7 illustrates an example procedure 700 by which events may be queued for handling in an application executing on a computing device.

In step 710, a primary application associated with a primary process (e.g., primary process 220) executes, in parallel, a guest process (e.g., guest process 230) and an embedder process (e.g., embedder process 220). The primary application builds a queue including multiple events for handling by the guest process. For example, the queue may be built by adding events to the queue as corresponding inputs are received, and removing events from the queue as the events are handled, as described in conjunction with a single event in FIG. 6.

In step 720, the primary application determines whether the guest process has crashed or been unresponsive during a threshold time period (e.g., 0.5 seconds, 1 second, 2 seconds, etc.). The threshold time period may be determined based on a processing speed, a network connection speed, or a user-interface responsiveness speed of a computing device (e.g., client computing device 110) executing the primary application. If the guest process has not crashed or been unresponsive during the threshold time period, the procedure 700 returns to step 710. If the guest process has crashed or been unresponsive during the threshold time period, the primary application records a first time when the guest process has crashed or become unresponsive, and the procedure 700 continues to step 730.

In step 730, if the guest process has crashed or been unresponsive during the threshold time period, the primary application signals for handling of first unprocessed events in the queue by the embedder process. The first unprocessed events are unprocessed at the first time, associated with step 720, when the guest process is determined to have crashed or to have been unresponsive during the threshold time period.

In step 740, the primary application determines whether the guest process is operational again. The guest process may become operational again, for example, due to a self-recovery from the crash or a completion of processing command(s) that were previously making the guest process unresponsive. If the guest process has not become operational again, the procedure 700 returns to step 730. If the guest process has become operational again, the primary application records a second time when the guest process became operational again, and the procedure 700 continues to step 750.

In step 750, if the guest process has become operational again, the primary application signals for handling of second unprocessed events in the queue by the guest process. The second unprocessed events are unprocessed at the second time, associated with step 740, when the guest process is determined to be operational again.

During implementation of the steps 710-750 of the procedure 700, events are enqueued to the queue, for example, when associated user inputs for causing the events are received. Events are dequeued from the queue when the events are handled, for example, by either the guest process or the embedder process. After step 750, the procedure 700 ends.

The steps of the procedures 400, 500, 600, and 700 are described herein as being implemented according to a certain order and in series. However, the steps may be implemented in any order. In some examples, two or more of the steps in any of the above procedures may be implemented in parallel.

Figure 8:
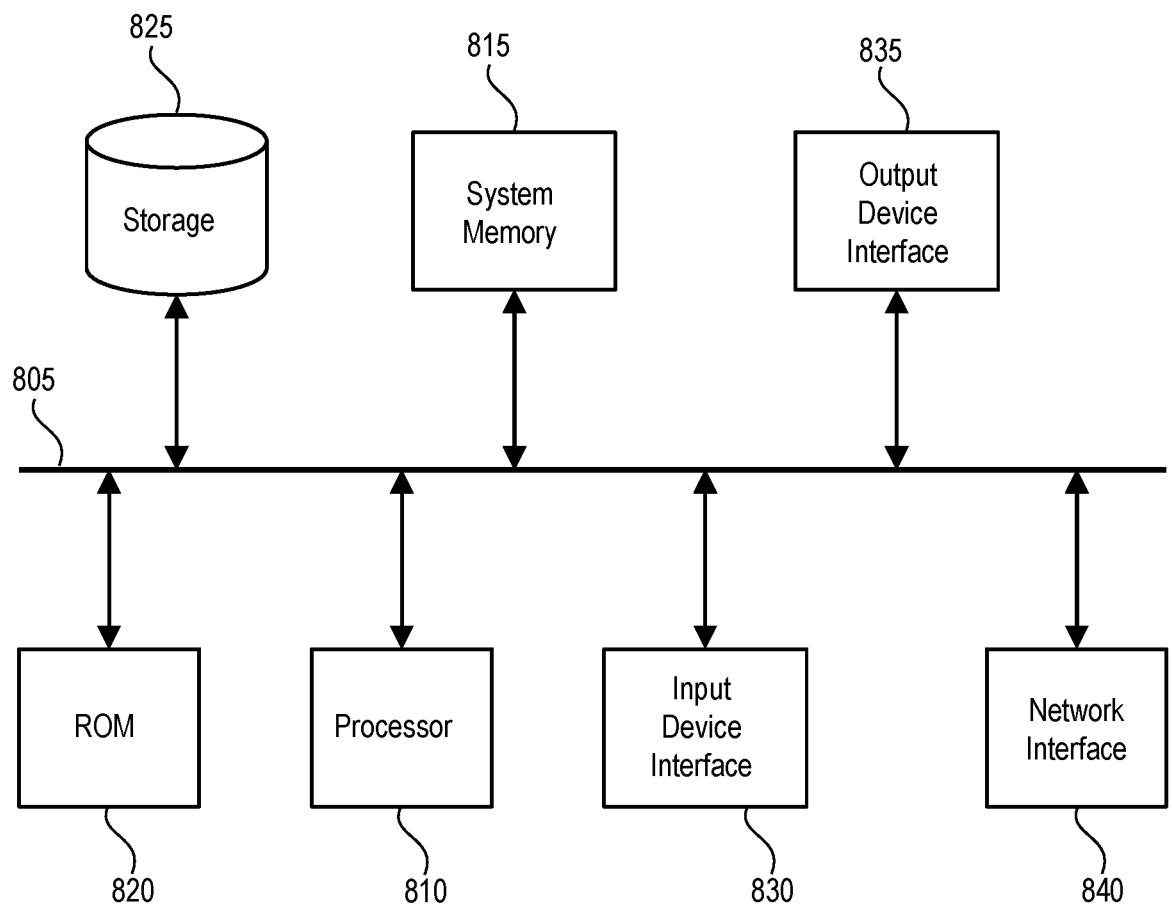
FIG. 8 conceptually illustrates an example electronic system with which some implementations of the subject technology are implemented.

FIG. 8 conceptually illustrates an electronic system 800 with which some implementations of the subject technology are implemented. For example, one or more of the client computing device 110 or the web server 130 may be implemented using the arrangement of the electronic system 800. The electronic system 800 can be a computer (e.g., a mobile phone, PDA), or any other sort of electronic device. Such an electronic system includes various types of computer readable media and interfaces for various other types of computer readable media. Electronic system 800 includes a bus 805, processing unit(s) 810, a system memory 815, a read-only memory 820, a permanent storage device 825, an input device interface 830, an output device interface 835, and a network interface 840.

The bus 805 collectively represents all system, peripheral, and chipset buses that communicatively connect the numerous internal devices of the electronic system 800. For instance, the bus 805 communicatively connects the processing unit(s) 810 with the read-only memory 820, the system memory 815, and the permanent storage device 825.

From these various memory units, the processing unit(s) 810 retrieves instructions to execute and data to process in order to execute the processes of the subject technology. The processing unit(s) can be a single processor or a multi-core processor in different implementations.

The read-only-memory (ROM) 820 stores static data and instructions that are needed by the processing unit(s) 810 and other modules of the electronic system. The permanent storage device 825, on the other hand, is a read-and-write memory device. This device is a non-volatile memory unit that stores instructions and data even when the electronic system 800 is off. Some implementations of the subject technology use a mass-storage device (for example a magnetic or optical disk and its corresponding disk drive) as the permanent storage device 825.

Other implementations use a removable storage device (for example a floppy disk, flash drive, and its corresponding disk drive) as the permanent storage device 825. Like the permanent storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the processes of the subject technology are stored in the system memory 815, the permanent storage device 825, or the read-only memory 820. For example, the various memory units include instructions for recovering a process in an application, presenting an image in an application, or handling an event in application in accordance with some implementations. From these various memory units, the processing unit(s) 810 retrieves instructions to execute and data to process in order to execute the processes of some implementations.

The bus 805 also connects to the input and output device interfaces 830 and 835. The input device interface 830 enables the user to communicate information and select commands to the electronic system. Input devices used with input device interface 830 include, for example, alphanumeric keyboards and pointing devices (also called "cursor control devices"). Output device interfaces 835 enables, for example, the display of images generated by the electronic system 800. Output devices used with output device interface 835 include, for example, printers and display devices, for example cathode ray tubes (CRT) or liquid crystal displays (LCD). Some implementations include devices for example a touch screen that functions as both input and output devices.

Finally, as shown in FIG. 8, bus 805 also couples electronic system 800 to a network (not shown) through a network interface 840. In this manner, the electronic system 800 can be a part of a network of computers (for example a local area network (LAN), a wide area network (WAN), or an Intranet, or a network of networks, for example the Internet. Any or all components of electronic system 800 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method, comprising:
executing, by a primary process of a host application, an embedder process in the host application together with a guest process, wherein the embedder process is configured to store and process content trusted by the host application, and the guest process is different than the embedder process and stores external content received from an external source;

receiving, by the primary process from the guest process, a request for the embedder process to present for display, within the host application, an image associated with the external content stored by the guest process;

signaling, by the primary process, the embedder process to provide size constraints for the image;

receiving, by the primary process and from the embedder process, the size constraints for the image, the size constraints being smaller than a visual output associated with the host application;

signaling the guest process to adjust the size of the image based on the size constraints;

receiving, from the guest process, the image at a size that does not satisfy the size constraints;

in response to receiving the image at the size that does not satisfy the size constraints, adjusting, by the embedder process, the size of the image to satisfy the size constraints; and providing, by the embedder process for display within the host application, the image at the adjusted size.

2. The method of claim 1, wherein
adjusting the size of the image comprises cropping the image.

3. The method of claim 1, wherein the primary process is different than the embedder process and the guest process.

4. The method of claim 1, further comprising:
in response to signaling the guest process to adjust the size of the image, adjusting, by the guest process, the size of the image.

5. The method of claim 1, wherein the host application is a web browser, wherein the embedder process is associated with an application executing within and downloaded by the web browser, and wherein the application provides displayable content.

6. A system, comprising:
one or more processors; and
a non-transitory memory having instructions thereon that, when executed by the one or more processors, cause the one or more processors to:
execute a primary process, an embedder process, and a guest process in a host application, the embedder process being configured to store and process content trusted by the host application, and the guest process being different than the embedder process and configured to store external content received from an external source,
wherein the primary process:
receives, from the guest process, a request for the embedder process to present for display, within the host application, an image associated with the external content stored by the guest process;
signals the embedder process to provide size constraints for the image;
receives the size constraints for the image, the size constraints being smaller than a visual output associated with the host application;
signals the guest process to adjust the size of the image based on the size constraints; and
receives, from the guest process, the image at a size that does not satisfy the size constraints, and
wherein the embedder process:

in response to receiving the image at the size that does not satisfy the size constraints, adjusts the size of the image to satisfy the size constraints; and
provides, for display within the host application, the image at the adjusted size.

7. The system of claim 6, wherein
the embedder process adjusts the size of the image by at least cropping the image.

8. The system of claim 6, wherein the primary process is different than the embedder process and the guest process.

9. The system of claim 6, wherein
the guest process adjusts the size of the image in response to the primary process signaling the guest process to adjust the size of the image.

10. The system of claim 6, wherein the host application is a web browser, wherein the embedder process is associated with an application executing within and downloaded by the web browser, and wherein the application provides displayable content.

11. A non-transitory computer-readable medium comprising instructions which, when executed by one or more processors, cause the one or more processors to:
execute a primary process, an embedder process, and a guest process in a host application, the embedder process being configured to store and process content trusted by the host application, and the guest process being different than the embedder process and configured to store external content received from an external source,
wherein the primary process:
receives, from the guest process, a request for the embedder process to present for display, within the host application, an image associated with the external content stored by the guest process;
signals the embedder process to provide size constraints for the image;
receives the size constraints for the image, the size constraints being smaller than a visual output associated with the host application;
signals the guest process to adjust the size of the image based on the size constraints; and
receives, from the guest process, the image at a size that does not satisfy the size constraints, and
wherein the embedder process:
in response to receiving the image at the size that does not satisfy the size constraints, adjusts the size of the image to satisfy the size constraints; and
provides, for display within the host application, the image at the adjusted size.

12. The non-transitory computer-readable medium of claim 11, wherein
the embedder process adjusts the size of the image by at least cropping the image.

13. The non-transitory computer-readable medium of claim 11, wherein the primary process is different than the embedder process.

14. The non-transitory computer-readable medium of claim 11, wherein
the guest process adjusts the size of the image in response to the primary process signaling the guest process to adjust the size of the image.

15. The non-transitory computer-readable medium of claim 11, wherein the host application is a web browser, wherein the embedder process is associated with an application executing within and downloaded by the web browser, and wherein the application provides displayable content.

16. The method of claim 1, wherein adjusting the size of the image comprises presenting white space with the image.

17. The system of claim 6, wherein the embedder process adjusts the size of the image by at least presenting white space with the image.

18. The non-transitory computer-readable medium of claim 11, wherein the embedder process adjusts the size of the image by at least presenting white space with the image.

* * * * *